US006735955B2

(12) United States Patent  
Mannarino

(10) Patent No.: US 6,735,955 B2
(45) Date of Patent: May 18, 2004

(54) CONTROL SYSTEM FOR POSITIONING COMPRESSOR INLET GUIDE VANES

(75) Inventor: Giovanni Mannarino, Montreal (CA)

(73) Assignee: Goodrich Pump & Engine Control Systems, Inc., Charlotte, NC (US)

( * ) Notice: Subject to any disclaimer, the term of this patent is extended or adjusted under 35 U.S.C. 154(b) by 0 days.

(21) Appl. No.: 09/974,585

(22) Filed: Oct. 10, 2001

(65) Prior Publication Data

US 2003/0066294 A1 Apr. 10, 2003

(51) Int. Cl.[7] .................................................. F02C 9/20
(52) U.S. Cl. ............................................................ 60/794
(58) Field of Search ........................ 60/39.27, 240, 60/794; 415/36

(56) References Cited

U.S. PATENT DOCUMENTS

| 4,184,327 A | * | 1/1980 | Cornett et al. ............. 60/39.27 |
| 4,221,114 A | | 9/1980 | Wilde et al. |
| 4,928,482 A | * | 5/1990 | Pollak et al. ............... 60/39.27 |
| 5,042,245 A | | 8/1991 | Zickwolf, Jr. |
| 5,259,188 A | * | 11/1993 | Baxter et al. ............... 60/39.29 |

FOREIGN PATENT DOCUMENTS

| GB | 2 016 597 A | 9/1979 |
| GB | 2 119 862 A | 11/1983 |

* cited by examiner

Primary Examiner—Louis J. Casaregola
(74) Attorney, Agent, or Firm—Scott D. Wofsy; Edwards & Angell, LLP

(57) ABSTRACT

A control system is disclosed for optimizing the transient response of a gas turbine engine by controlling the variable positioning of compressor inlet guide vanes. The system employs a normal mode schedule which schedules relatively closed inlet guide vane settings at low compressor speeds and relatively open inlet guide vane settings at high compressor speeds. The system further employs an alternate mode schedule that schedules inlet guide vane settings that are more closed at low compressor speeds than those scheduled by the normal mode schedule. Control logic is provided for rapidly moving the inlet guide vanes from the more closed settings of the alternate mode schedule to settings which are more open than those which are schedule by the normal mode schedule, during an acceleration from low engine power levels. The control logic is further configured to command the inlet guide vanes back to the normal mode schedule as the acceleration nears completion.

4 Claims, 5 Drawing Sheets

Steady-State IGV Schedules

CONTROL SYSTEM FOR POSITIONING COMPRESSOR INLET GUIDE VANES

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject invention relates to the operation of gas turbine engines, and more particularly, to a control system for positioning compressor inlet guide vanes on a gas turbine engine in such a manner that produces optimized engine transient response.

2. Background of the Related Art

Gas turbine engine for use in rotary wing aircraft, such as helicopters, are typically designed with variable compressor inlet guide vanes (IGVs) which are used in such a manner so as to minimize engine fuel burn. FIGS. 1a and 1b are compressor performance maps illustrating typical compressor performance characteristics as a function of IGV setting, compressor speed and inlet airflow. The variable positioning of the inlet guide vanes allows for optimization of compressor efficiency for a desired engine power level and given air inlet conditions at steady-state conditions. This in turn results in minimized engine fuel burn which is of particular importance at aircraft cruise power conditions.

Modern state-of-the-art digital control systems typically control the positioning of compressor IGV's according to a normal mode schedule which is illustrated in FIG. 2. The normal mode schedule is typically derived by engine performance engineers and is optimized solely for steady-state engine performance. It would be beneficial however to provide a control strategy for positioning inlet guide vanes during rapid engine accelerations and decelerations in an effort to optimize engine transient response.

SUMMARY OF THE INVENTION

The subject invention is directed to a control system controlling the variable positioning of the compressor inlet guide vanes of a gas turbine engine. The system employs a normal mode schedule or map which schedules relatively closed inlet guide vane settings at low compressor speeds and relatively open inlet guide vane settings at high compressor speeds. The normal mode schedule is adapted and configured to optimize engine performance by minimizing fuel burn during steady-state engine operation.

The system further employs an alternate mode schedule or map which schedules inlet guide vane settings that are more closed at low compressor speeds than those scheduled by the normal mode schedule. The alternate mode schedule is adapted and configured to optimize transient engine response during fast engine acceleration.

Control logic is provided for rapidly moving the inlet guide vanes from the more closed settings of the alternate mode schedule to settings that are more open than those scheduled by the normal mode schedule, during an acceleration from low engine power levels. The control logic is further configured to smoothly command the inlet guide vanes back to the settings of the normal mode schedule as the engine acceleration nears completion.

These and other aspects of the subject invention will become more readily apparent to those having ordinary skill in the art from the following detailed description of the invention taken in conjunction with the drawings described hereinbelow.

BRIEF DESCRIPTION OF THE DRAWINGS

So that those having ordinary skill in the art to which the subject invention pertains will more readily understand how to employ the control system of the subject invention, preferred embodiments thereof will be described in detail hereinbelow with reference to the drawings, wherein.

DETAILED DESCRIPTION OF PREFFERED EMBODIMENTS

Figure 1A:
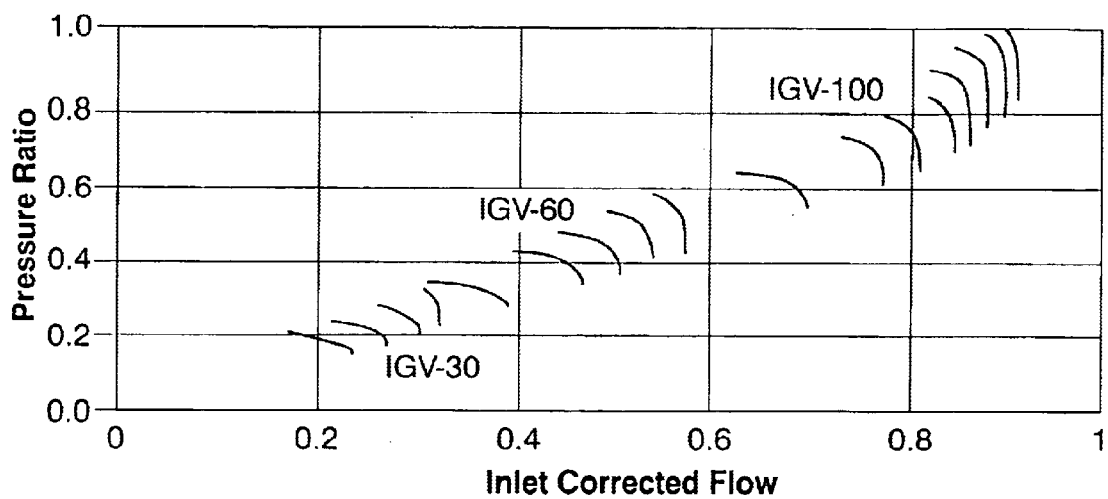
FIGS. 1a and 1b are compressor performance maps illustrating typical compressor performance characteristics as a function of IGV setting, compressor speed and airflow.
Figure 1B:
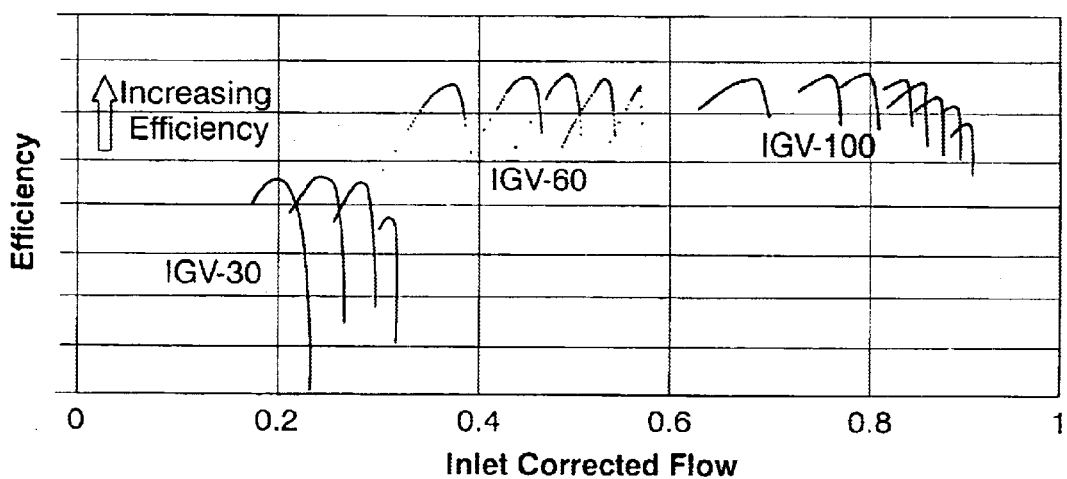
Figure 2A:
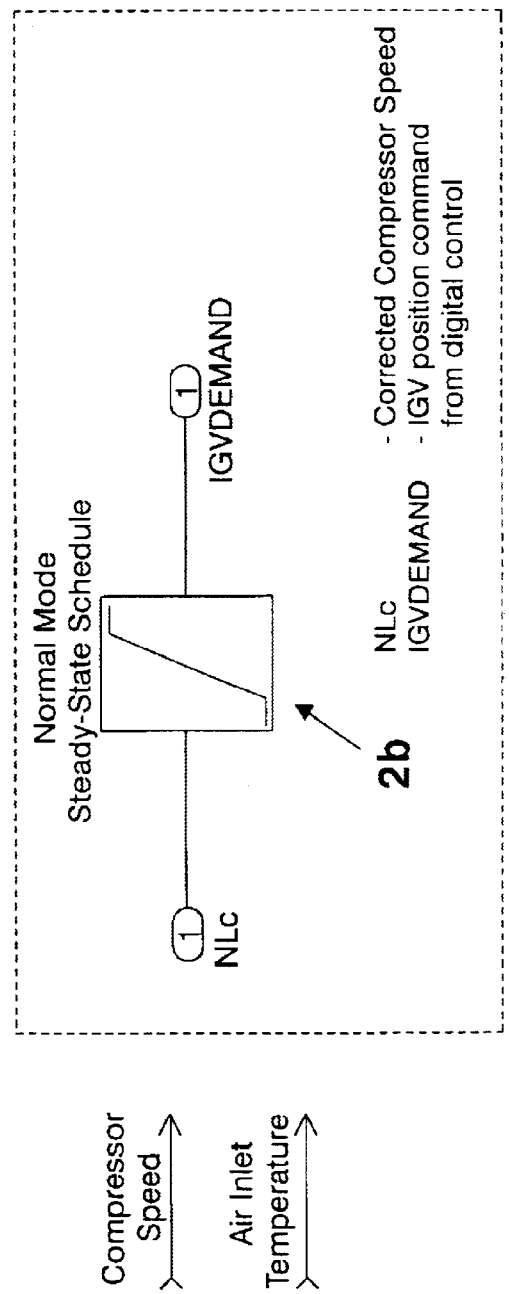
FIGS. 2a and 2b illustrate a conventional open-loop steady-state schedule (hereinafter the "normal mode schedule") for positioning the compressor inlet guide vanes of a gas turbine engine.
Figure 2B:
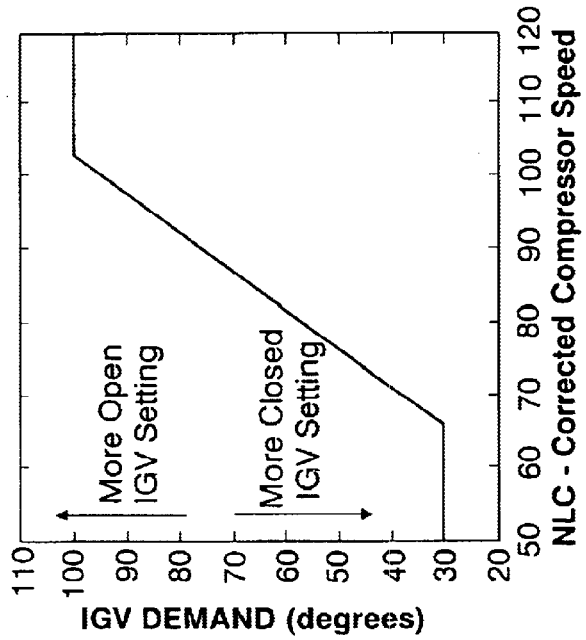

As noted above, modern state-of-the-art digital control systems direct the positioning of compressor inlet guide vanes according to a normal mode schedule which is illustrated in FIG. 2. The normal mode schedule receives an input signal indicative of the corrected compressor speed $NL_C$ and outputs a signal indicative of the IGV position commanded from digital engine control (IGVDEMAND). In accordance with the normal mode control schedule, the inlet guide vanes are set at an angle of about 30° until $NL_C$ approaches about 66%. Thereabout, in accordance with the normal mode schedule, the inlet guide vane angles move to more open settings which reach a maximum open position at an angle of about 100° corresponding to the $NL_C$ approaching about 103%.

The subject invention optimizes engine transient response through the use of an alternate IGV control strategy. In this strategy, the normal mode IGV schedule is maintained for high engine power levels to minimize or otherwise optimize fuel burn during normal engine operation, such as during steady-state flight conditions. At lower engine power levels, the alternate mode IGV schedule is designed to maintain high compressor speed while compromising on operating efficiency and engine fuel burn. At the lower engine power levels, the alternate mode schedule is considered "more closed" than the normal mode schedule.

Figure 3:
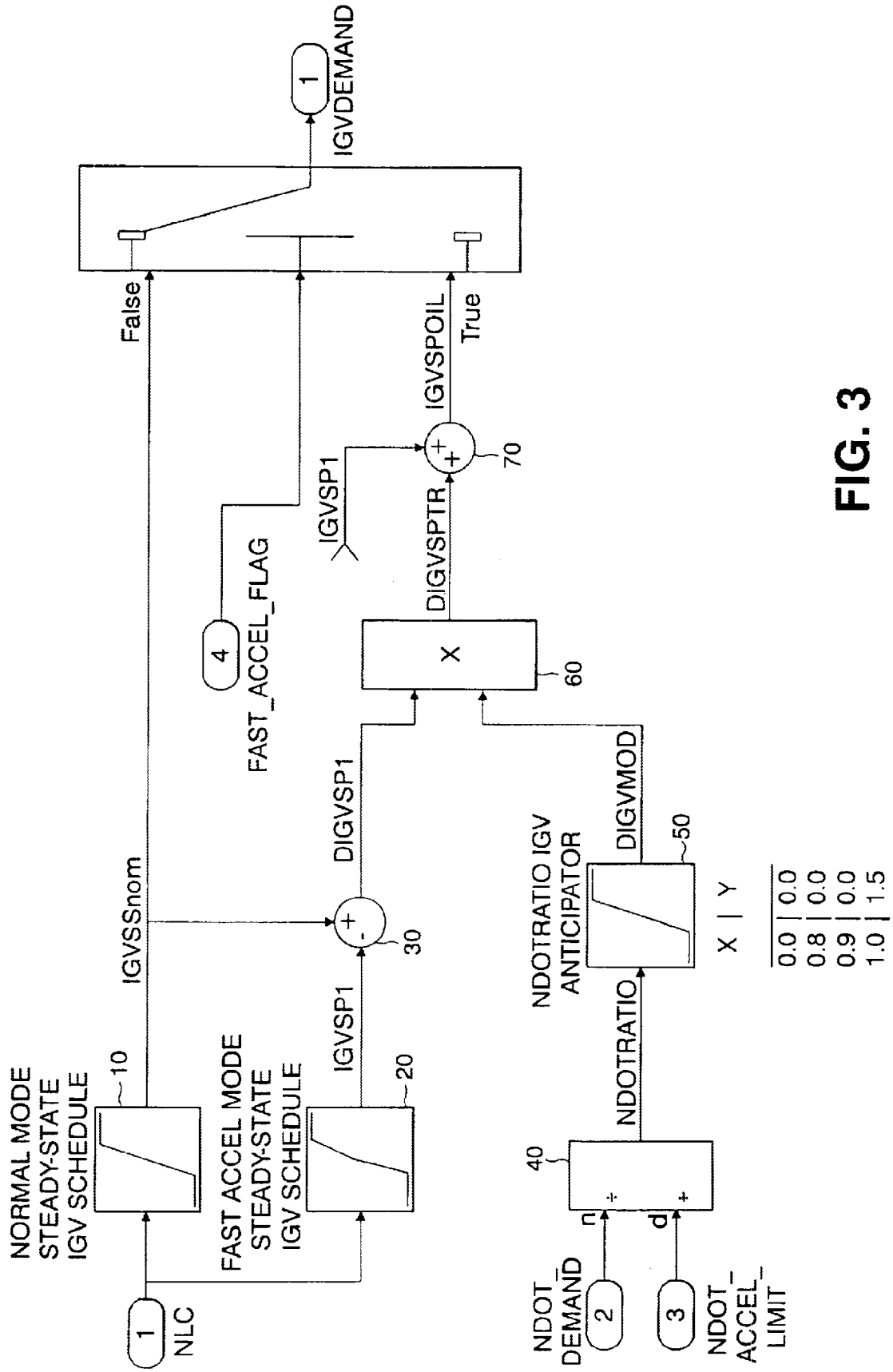
FIG. 3 illustrates the control logic of the subject invention which incorporates the conventional normal mode schedule of FIG. 2b and an alternate mode schedule for fast engine acceleration.
Figure 4A:
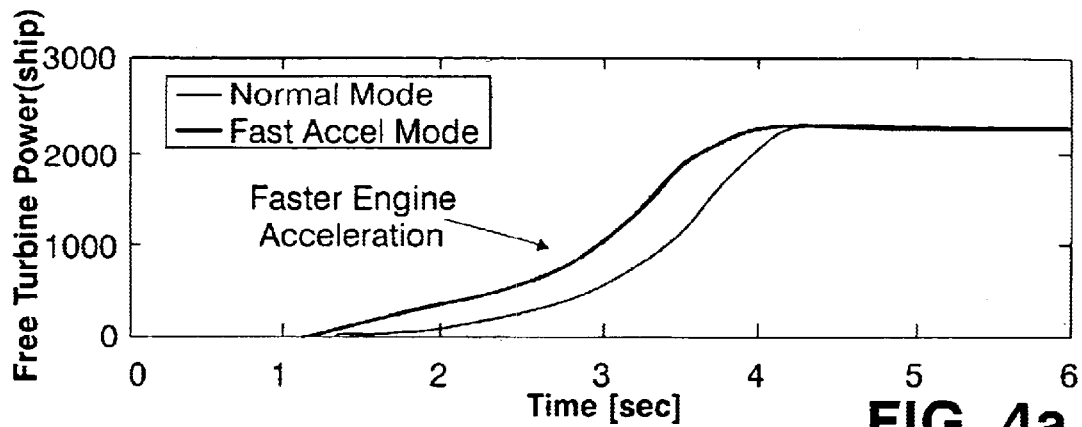
FIGS. 4a–4d illustrate simulation results of a gas turbine engine rapid acceleration with the normal mode IGV control and with alternate mode IGV control.
Figure 4B:
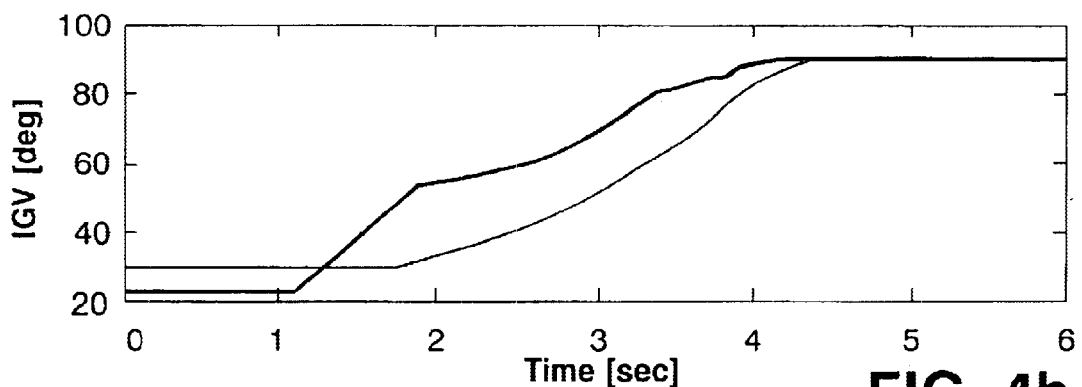
Figure 4C:
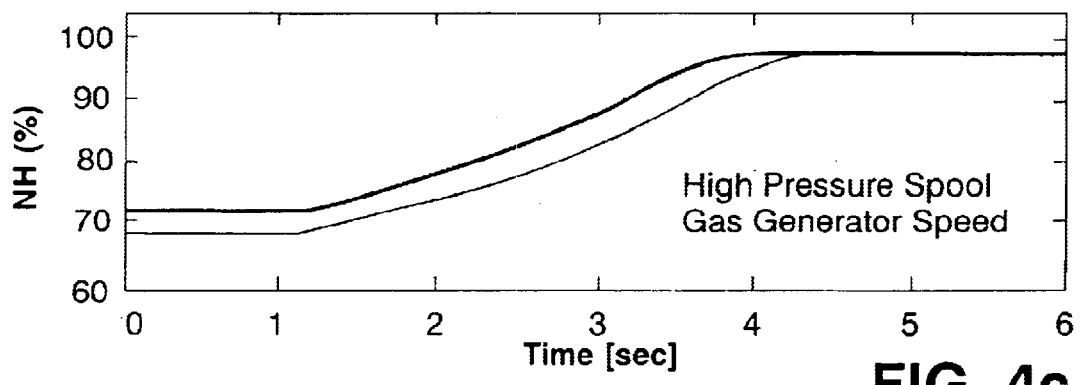
Figure 4D:
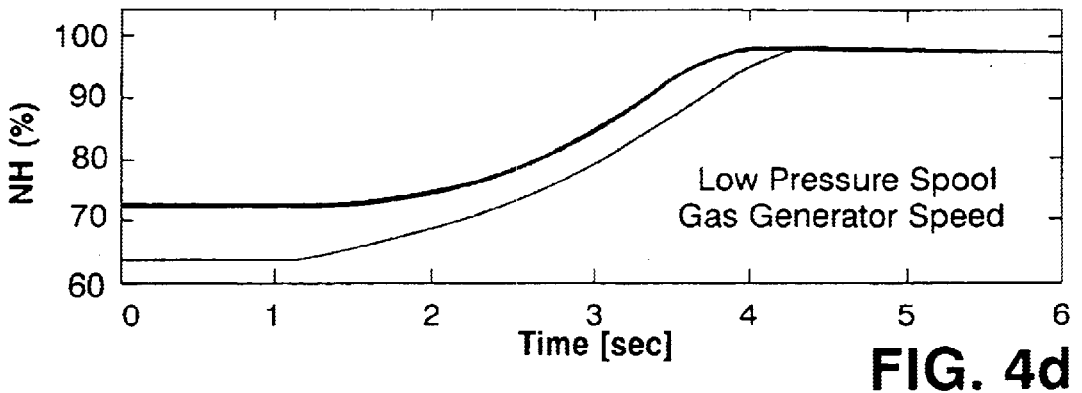

The subject invention further includes transient control logic for use during fast engine accelerations from low engine power. The control logic, which is described in more detail hereinbelow with reference to FIG. 3, is configured to rapidly move the inlet guide vanes from the "more closed" position of the alternate mode schedule to settings which are "more open" than the normal mode schedule. (See FIG. 4b) Then, as the engine acceleration nears completion, the control logic smoothly commands the inlet guide vanes back to their normal mode schedule.

Referring to FIG. 3, there is illustrated the IGV control strategy or logic of the subject invention. As configured, the normal mode IGV schedule 10 is selected when the FAST_ACCEL_FLAG is set equal to FALSE. Alternatively, when the FAST_ACCEL_FLAG is set equal to TRUE, the IGV control logic of the subject invention is invoked, and the alternate mode IGV schedule 20 is employed. This results in faster engine accelerations than are provided under the normal mode schedule.

Figure 3A:
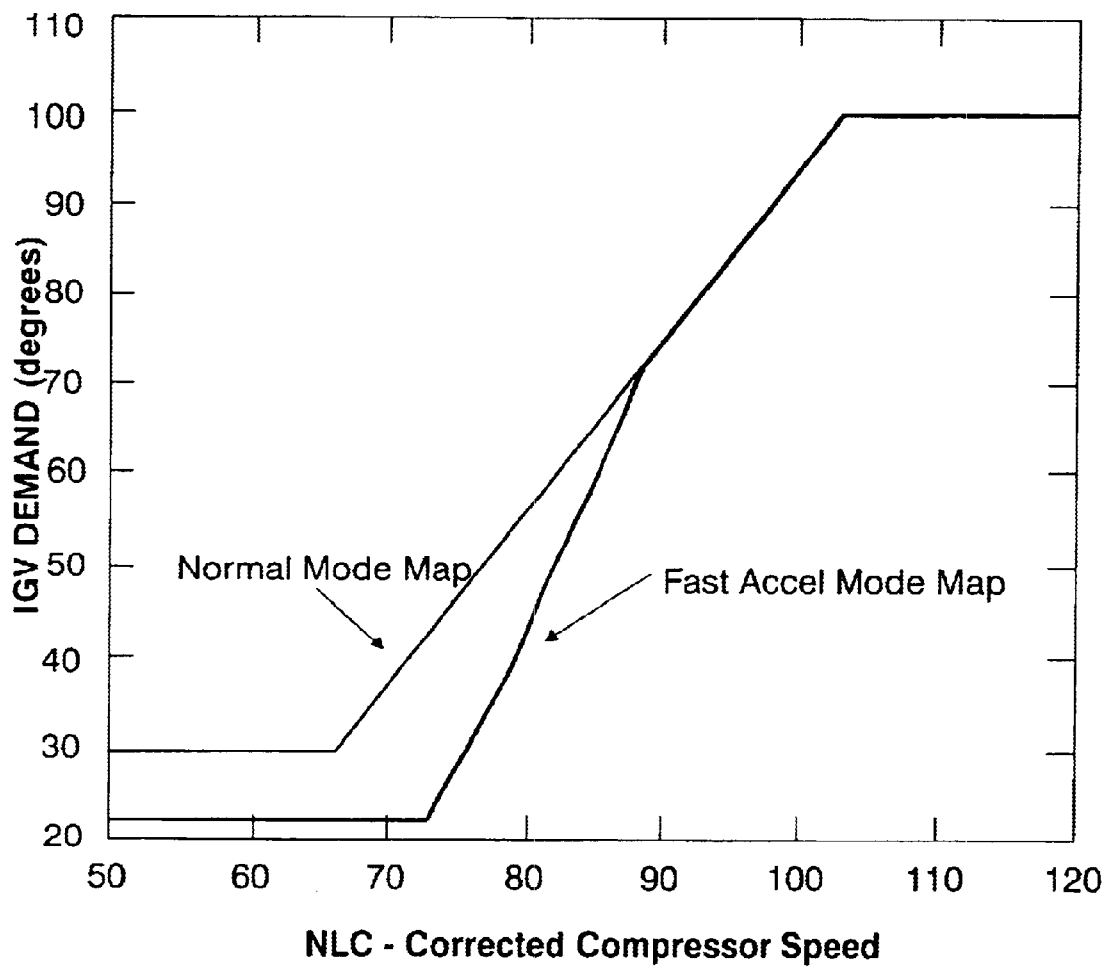
FIG. 3a illustrates the alternate mode schedule overlaid with the normal mode schedule to illustrate the relative differences therein.

In the fast engine acceleration mode, the alternate IGV schedule 20 schedules "more closed" IGV's at low engine speeds than those which are scheduled by the normal mode schedule at low engine speeds, as illustrated in FIG. 3a. For example, the normal mode schedule 10 provides that the inlet guide vanes are set at an angle of about 30° until the corrected compressor speed approaches about 66%. In contrast, the alternate mode schedule 20 provides that the inlet guide vanes are set at an angle of about 20° until the corrected compressor speed approaches about 73%.

With continuing reference to FIG. 3, based upon an input signal indicative of the corrected compressor speed $NL_C$, the output of the alternate IGV schedule 20 is the IGV setting IGVSP1. The difference in IGV setting between the alternate fast acceleration mode schedule (IGVSP1) and the normal mode schedule (IGVSSNOM) is then computed at summing junction 30 to obtain (DIGVSP1). An acceleration ratio (NDOTRATIO) is then computed at division block 40 based on the ratio of the acceleration rate demand (NDOT_DEMAND) which defines the numerator of the ratio and the maximum acceleration limit (NDOT_ACCEL_LIMIT) which defines the denominator of the ratio.

This ratio is then used to compute an IGV anticipator value (DIGVMOD) using a look-up table 50. The anticipator is zero (0) for low NDOTRATIO's and is greater than one (1.0) when NDOTRATIO nears 1.0. The anticipator value DIGVMOD is then multiplied with DIGVSP1 at multiplication block 60 to produce the transient IGV demand DIGVSPTR. The demanded transient IGV is then added to the scheduled IGVSP1 at summing junction 70 to produce the final command signal from the fast acceleration mode IGV logic, which is IGVSPOIL.

Referring to FIG. 4, there is illustrated simulation results of a gas turbine engine rapid acceleration with the normal mode IGV control and with the alternate IGV control, with respect to free turbine speed, IGV, high pressure spool speed (NH), and low pressure spool speed (NL). As illustrated, in accordance with the alternate mode schedule, as the engine is accelerated from a low power level, the inlet guide vane angle rapidly increases from the more closed setting of about 20° to the more open setting of about 60° in under one second. Consequently, there is a rapid output of engine power during acceleration.

The gas turbine engine used for this simulation was a turboshaft engine with a two-spool gas generator and free turbine driving a helicopter rotor system. The low pressure compressor was equipped with variable inlet guide vanes. The acceleration rates were the same for both traces in FIG. 4 and the improvement in engine power response is due solely to the alternate IGV control strategy.

It is envisioned that the control strategy of the subject invention can be employed in any gas turbine application equipped with inlet guide vanes where transient engine performance is important. For example, the control strategy of the subject invention may be employed in gas turbines powering helicopter rotor systems, electrical power generating systems or propeller drive systems. It is also envisioned that the control strategy of the subject invention, which results in more rapid power output during gas turbine accelerations, may be applied to gas turbine decelerations. In such an instance, more rapid engine power drops can be achieved. Further, the control strategy of the subject invention can be employed in any gas turbine application whether single or multiple gas generator spools are employed.

Although the control system of the subject invention has been described with respect to preferred embodiments, those skilled in the art will readily appreciate that changes and modifications may be made thereto without departing from the spirit and scope of the present invention as defined by the appended claims.

What is claimed is:

1. A system for controlling variable positioning of compressor inlet guide vanes of a gas turbine engine comprising:
   a) a normal mode steady-state schedule which schedules relatively closed inlet guide vane settings at low compressor speeds and relatively open inlet guide vane settings at high compressor speeds;
   b) an alternate mode steady-state schedule which schedules inlet guide vane settings that are more closed at low compressor speeds than those scheduled by the normal mode schedule; and
   c) means for rapidly moving the inlet guide vanes from the more closed settings of the alternate mode schedule to settings which are more open than those that are scheduled by the normal mode schedule during an acceleration from low engine power levels, and for commanding the inlet guide vanes back to the normal mode steady-state schedule as the acceleration nears completion.

2. A system as recited in claim 1, further comprising means for invoking the alternate mode schedule during or in anticipation of a fast engine acceleration.

3. A system for controlling variable positioning of compressor inlet guide vanes of a gas turbine engine based on optimized engine transient response comprising:
   a) means for scheduling the inlet guide vanes to settings that are more closed than those that are scheduled in an optimum fuel burn schedule, during steady-state operating conditions and in anticipation of an engine acceleration, resulting in higher compressor speeds; and
   b) means for providing anticipation in the control of the inlet guide vanes such that the inlet guide vanes are moved to positions that are more open than those that are scheduled in an optimum fuel burn schedule, during engine accelerations, resulting in a more rapid increase in engine output power.

4. A system as recited in claim 3, further comprising means for commanding the inlet guide vanes back to the optimum fuel burn schedule as the engine acceleration nears completion.

* * * * *